US006765076B2

(12) United States Patent
Benicewicz et al.

(10) Patent No.: US 6,765,076 B2
(45) Date of Patent: Jul. 20, 2004

(54) TRANSITION METAL SUPEROXIDES

(75) Inventors: Brian C. Benicewicz, Loudonville, NY (US); Subbareddy Kanagasabapathy, Shrewsbury, MA (US); Arumugam Sudalai, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 17 days.

(21) Appl. No.: 10/102,542

(22) Filed: Mar. 20, 2002

(65) Prior Publication Data

US 2003/0060577 A1 Mar. 27, 2003

Related U.S. Application Data

(60) Provisional application No. 60/277,175, filed on Mar. 20, 2001.

(51) Int. Cl.$^7$ .................................................. C08F 4/30
(52) U.S. Cl. ........................................ 526/227; 526/89
(58) Field of Search .................................. 526/227, 89

(56) References Cited

U.S. PATENT DOCUMENTS

| | | |
|---|---|---|
| 4,101,644 A | 7/1978 | Frosch et al. |
| 4,397,833 A | 8/1983 | Doetsch et al. |
| 4,410,402 A | 10/1983 | Sawyer et al. |
| 4,513,144 A | 4/1985 | Fenton |
| 4,731,197 A | 3/1988 | Eckstein et al. |
| 4,801,359 A | 1/1989 | Jeanne et al. |
| 5,358,657 A | 10/1994 | Sawyer et al. |
| 5,658,649 A | 8/1997 | Wrobleski et al. |

FOREIGN PATENT DOCUMENTS

WO WO 98/01478 1/1998

OTHER PUBLICATIONS

Han et al, Polymerization of Acrylonitrile Initiated by KO2—Nitrobenzene, Journal of Polymer Science: Polymer Chemistry Edition, vol. 21, pp. 73–81 (1983).*

Anpo et al., Generation of Superoxide Ions at Oxide Surfaces, J.C. Balzer AG, Science Publishers, Topics in Catalysts 8, pp. 189–198 (1999).*

Dewkar et al., An Exceptionally Stable Ti Superoxide Radical Ion: A Novel Heterogeneous Catalyst for the Direct Conversion o Aromatic Primary Amines to Nitro Compounds, Agnew Chem. Int. Ed., vol. 40, No. 2 pp. 405–408 (2001).*

Yang Kyoo Han et al., Polymerization of Acrylonitrile Initiated by KO2—Nitrobenzene, Journal of Polymer Science: Polymer Chemistry Edition, vol. 21, pp. 73–81 (1983).

Masakazu Anpo, et al., Generation of Superoxide Ions at Oxide Surfaces, J.C. Balzer AG, Science Publishers, Topics in Catalysis 8, pp. 189–198 (1999).

Gajanan K. Dewkar, et al., _An Exceptionally Stable Ti Superoxide Radical Ion: A Novel heterogeneous Catalyst for the Direct Conversion of Aromatic Primary Amines to Nitro Compounds, Agnew. Chem. Int. Ed. 2001, 40, No. 2, pp. 405–408.

Yang–Kyoo Han et al., Polymerization of Vinyl Monomers Initiated by KO2–Charge Transfer Agent Systems. II, Journal of Polymer Science; Polymer Chemistry Edition, vol. 29, pp. 281–286 (1991).

Zenjiro Osawa, et al., Reaction of Poly(vinyl Alcohol) with Superoxide Anion, Journal of Polymer Science: Polymer Chemistry Edition, vol. 19, pp. 1877–1884 (1981).

* cited by examiner

*Primary Examiner*—Robert Deshon Harlan
(74) *Attorney, Agent, or Firm*—Heslin Rothenberg Farley & Mesiti P.C.; Mary Louise Gioeni, Esq.

(57) ABSTRACT

Transition metal superoxides of formula $M(O_2)_n$, where M is a transition metal and n is equal to the valence of M, may be used as initiators for free radical polymerization, optionally, under conditions of living polymerization, with or without chain transfer agents. Polymers produced have a narrow molecular weight distribution and low polydispersity indexes when chain transfer agents and/or molecular weight controlling agents are used.

21 Claims, 1 Drawing Sheet

TRANSITION METAL SUPEROXIDES

CROSS-REFERENCE TO RELATED APPLICATIONS

This application claims the priority of U.S. provisional application No. 60/277,175, filed Mar. 20, 2001.

FIELD OF THE INVENTION

The invention relates to processes for free radical polymerization using transition metal superoxides as initiators.

BACKGROUND OF THE INVENTION

The superoxide radical anion $O_2^-$ is an active oxygen species that possesses both anionic and free radical properties. It is of particular interest in biological systems, where the superoxide dismutase enzyme catalyzes the dismutation of $O_2^-$ to $H_2O$ and $O_2$. because it appears to be involved in a variety of oxidation reactions. A variety of other applications for superoxide compounds are known. Commercially, potassium superoxide is utilized in self-contained breathing equipment for generation of oxygen gas. U.S. Pat. No. 4,731,197, for example, describes one such system. U.S. Pat. No. 4,101,644 discloses the use of calcium superoxide for the same function. Superoxide compounds have also been used to oxidize organic compounds for a variety of purposes. Purification of acetal monomers using alkali metal superoxides is described in U.S. Pat. No. 4,513,144. Detoxification of polyhalogenated organic compounds using superoxide is disclosed in U.S. Pat. No. 5,358,657. Dewkar et al. (Angew. Chem. Int. Ed., 40, pp 405–407 (2001)) employed titanium superoxide for the conversion of aromatic primary amines directly to nitro compounds. In polymeric systems, Osawa et al. (J. Polym. Sci., Polym. Chem. Ed., 19, pp 1877–1884 (1981)) depolymerized vinyl acetate polymers with potassium superoxide. Han et al. (J. Polym. Sci., Part A, 29, pp. 281–286 (1991)) describe use of potassium superoxide as an initiator for anionic polymerization of monomers having electron withdrawing substitutents: nitroethylene, acrylonitrile and acrolein. Monomers lacking such substituents, including methyl methacrylate and styrene, were unreactive toward the anionic superoxide initiator.

Anionic polymerization processes variously termed 'living,' 'controlled' or 'immortal' may be used to synthesize polymers having a narrow molecular weight distribution and low polydispersity ($\leq 1.5$). These processes are so named because polymerization generally occurs by addition of monomer units to a constant number of growing polymer chains until all monomer has been consumed; if more monomer is added, polymerization resumes. Molecular weight is controlled by the stoichiometry of the reaction, and is typically a linear function of conversion. Block copolymers with well-defined morphology prepared by such processes are of significant commercial importance. These living anionic processes are necessarily limited to use with monomers that can polymerize by an anionic mechanism, but many commercially important monomers do not undergo anionic polymerization under convenient conditions. Therefore, more recently, living free radical polymerizations have been investigated for monomers that polymerize by a free radical mechanism. In one example, International Application No. WO 99/01478 discloses use of dithioester chain transfer agents along with standard free radical initiators, including azobisisobutyronitrile and benzoyl peroxide, for living free radical polymerizations. However, there remains a need for new initiators of free radical polymerization, and, particularly, for living free radical polymerization.

In addition, contamination of polymers by initiator residues can negatively affect many desirable polymer properties, including, for example, thermal stability, color retention (or lack thereof), and water and/or solvent resistance or sensitivity. Heterogeneous initiators have not been used for free radical polymerization in the art, and, consequently, there is a need for initiators that can be readily separated from the polymer produced.

SUMMARY OF THE INVENTION

A new class of free radical initiators, transition metal superoxides, has been unexpectedly discovered that can initiate free radical polymerization, under conditions commonly used in free radical polymerization processes. These transition metal superoxides are solids, and are insoluble in most solvents, both aqueous and organic. In addition, polymers having a narrow molecular weight distribution and low polydispersity can be synthesized using these initiators. For the purposes of the present application, the term 'transition metal' refers to, in the periodic table, elements 21 through 29 (scandium through copper), 39 through 47 (yttrrium through silver), 57 through 79 (lanthanum through gold), all known elements from 89 (actinum) on, in addition to aluminum, gallium, indium and tin. In particular, titanium, tungsten, vanadium, and zirconium superoxides may be used.

In one aspect, the present invention relates to a free radical polymerization process comprising combining at least one monomer polymerizable by free radicals and at least one transition metal superoxide of formula $M(O_2)_n$, where M is a transition metal and n is equal to the valence of M; generating free radicals from said transition metal superoxide; and polymerizing said at least one monomer. In particular, the metal may be Ti, W, V, or Zr. At least one chain transfer agent or molecular weight controlling agent may be with the monomer and transition metal superoxide. In particular, the chain transfer agent may be a dithiocarboxylic ester of formula I:

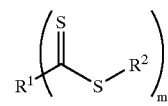

wherein $R^1$ is a m-valent radical selected from the group consisting of alkyl, substituted alkyl, haloalkyl, thioalkyl, heteroalkyl, substituted heteroalkyl, aryl, substituted aryl, haloaryl, thioaryl, substituted thioaryl, heteroaryl, substituted heteroaryl, alkylaryl, haloalkylaryl, thioalkylaryl and substituted thioalkylaryl;

$R^2$ is selected from the group consisting of alkyl, substituted alkyl, haloalkyl, thioalkyl, heteroalkyl, substituted heteroalkyl, aryl, substituted aryl, haloaryl, thioaryl, substituted thioaryl, heteroaryl, substituted heteroaryl, alkylaryl, haloalkylaryl, thioalkylaryl and substituted thioalkylaryl; and m is an integer from 1–6.

More particularly, the chain transfer agent may be a compound of structure II, III, or IV, or a combination thereof:

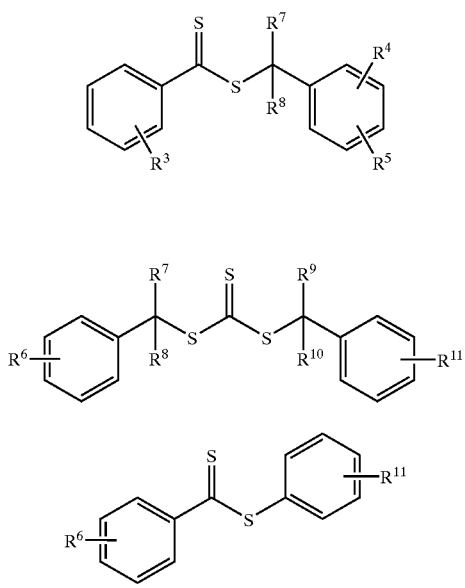

wherein
R[3] is hydrogen or haloalkyl;
R[4] is hydrogen or alkyl;
R[5] is hydrogen, haloalkyl or carboxy;
R[6] and R[11] are independently hydrogen, alkyl, alkoxy, cyano, halo, or carboxy; and
R[7], R[8], R[9] and R[10] are independently hydrogen, alkyl, cyano, aryl, or arylcarboxy.

In the context of the present invention, alkyl is intended to include linear, branched, or cyclic hydrocarbon structures and combinations thereof. Lower alkyl refers to alkyl groups of from 1 to 4 carbon atoms. Examples of lower alkyl groups include methyl, ethyl, propyl, isopropyl, butyl, s- and t-butyl. Preferred alkyl groups are those of $C_{20}$ or below. Cycloalkyl is a subset of alkyl and includes cyclic hydrocarbon groups of from 3 to 8 carbon atoms. Examples of cycloalkyl groups include c-propyl, c-butyl, c-pentyl, and norbornyl. Alkoxy or alkoxyl refers to groups of from 1 to 8 carbon atoms of a straight, branched, cyclic configuration and combinations thereof attached to the parent structure through an oxygen. Examples include methoxy, ethoxy, propoxy, isopropoxy, cyclopropyloxy, and cyclohexyloxy. Lower alkoxy refers to groups containing one to four carbons. Aryl means a 5- or 6-membered aromatic ring; a bicyclic 9- or 10-membered aromatic ring system; or a tricyclic 13- or 14-membered aromatic ring system; each of which rings is optionally substituted at 1–3 positions with lower alkyl, substituted alkyl, substituted alkynyl, =O, —$NO_2$, halogen, hydroxy, alkoxy, $OCH(COOH)_2$, cyano, —$NR^1R^2$, acylamino, phenyl, benzyl, phenoxy, benzyloxy, heteroaryl, or heteroaryloxy; each of said phenyl, benzyl, phenoxy, benzyloxy, heteroaryl, and heteroaryloxy optionally substituted with 1–3 substituents selected from lower alkyl, alkenyl, alkynyl, halogen, hydroxy, alkoxy, cyano, phenyl, benzyl, benzyloxy, carboxamido, heteroaryl, heteroaryloxy, —$NO_2$ or —NRR (wherein R is independently H, lower alkyl or cycloalkyl, and —RR may be fused to form a cyclic ring with nitrogen). The aromatic 6- to 14-membered carbocyclic rings include, for example, benzene, naphthalene, indane, tetralin, and fluorene. Arylalkyl means an alkyl residue attached to an aryl ring. Examples are benzyl and phenethyl. Substituted alkyl, aryl, cycloalkyl, or heterocyclyl refer to alkyl, aryl, cycloalkyl, or heterocyclyl wherein up to three H atoms in each residue are replaced with alkyl, aryl, haloalkyl, halogen, hydroxy, lower alkoxy, carboxy, carboalkoxy, carboxamido, cyano, carbonyl, nitro, amino (primary, secondary or tertiary), alkylthio, sulfoxide, sulfone, acylamino, amidino, phenyl, benzyl, heteroaryl, phenoxy, benzyloxy, or heteroaryloxy.

In another aspect, the present invention relates to a process for the preparation of a transition metal superoxide comprising combining 30% hydrogen peroxide and a transition metal precursor comprising a transition metal compound or complex that is soluble in an aqueous solvent system. The transition metal precursor may be a soluble transition metal alkoxide, oxyalkoxide, aryloxide, oxyaryloxide, or a complex thereof. The transition metal may be titanium, tungsten, vanadium, or zirconium.

In yet another aspect, the present invention relates to a transition metal superoxide produced by the process of described above.

In still another aspect, the present invention relates to composition comprising a transition metal superoxide of formula $M(O_2)_n$, wherein M is a transition metal other than titanium; and n is equal to the valence of M. In particular, M may be tungsten, vanadium or zirconium.

DETAILED DESCRIPTION OF THE INVENTION

Figure 1:
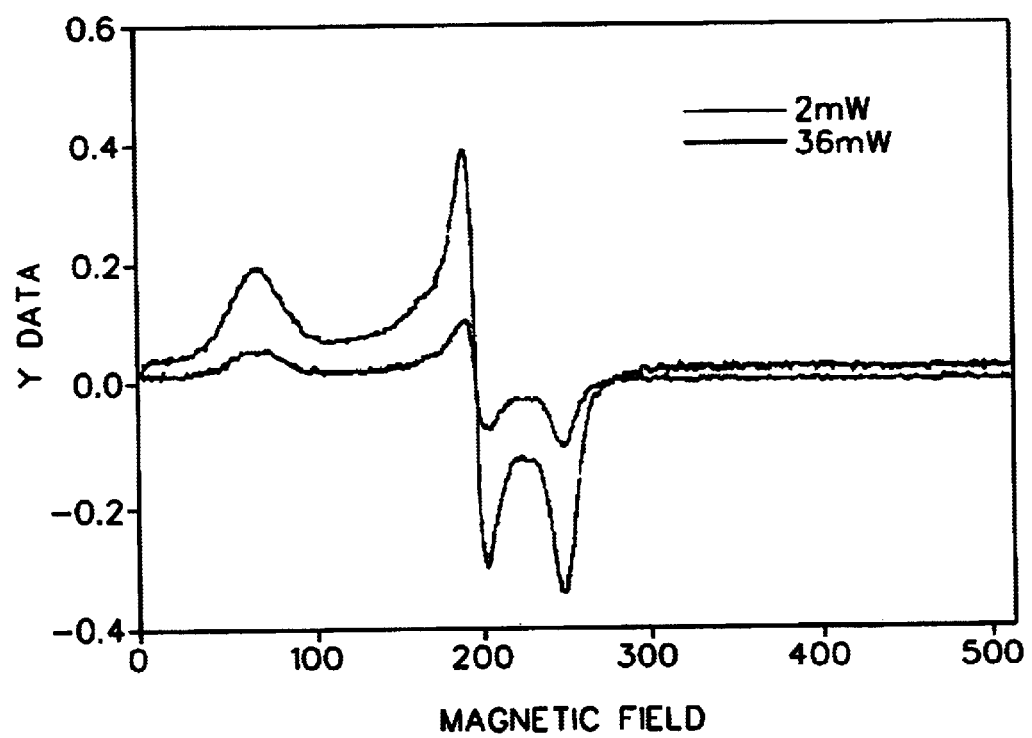
FIG. 1 is an electron spin resonance spectrograph (ESR) of titanium superoxide prepared by the process of the present invention.

Transition metal superoxides useful as initiators of free radical polymerizations may be prepared by reaction of a soluble transition metal precursor with a 30% hydrogen peroxide solution at temperatures ranging from 0° C. to 100° C. In general, superoxides have been prepared by reaction of a compound or complex of the metal with a more strongly oxidizing solution of hydrogen peroxide, and concentrations of at least 50% were believed necessary for successful conversion to the superoxide radical anion. (See, for example, Dewkar, et al., Angew. Chem. Int. Ed., 40, pp 405–407 (2001), for preparation of titanium superoxide using 50% hydrogen peroxide.) It has been surprisingly found that reaction of a soluble transition metal precursor with a less strongly oxidizing solution of hydrogen peroxide yields the transition metal superoxide, and under much safer conditions. The reaction solvent is typically an organic solvent that is miscible with the aqueous $H_2O_2$, and may be an alcohol, such as methanol. The precursor may be any transition metal compound or complex that is soluble in the aqueous reaction solvent system, and, particularly, soluble transition metal alkoxides, oxyalkoxides, aryloxides, and oxyaryloxides, or complexes thereof. Examples of suitable precursors are titanium (IV) isopropoxide, $Ti[OCH(CH_3)_2]_4$, vanadium (V) oxytriisopropoxide, $[(CH_3)_2CHO]_3VO$, zirconium (V) isopropoxide isopropanol complex, $Zr[OCH(CH_3)_2]_4 \cdot (CH_3)_2CHOH$ and tungsten hexacarbonyl, $W(CO)_6$. All of these are available from Aldrich. The solid product generally precipitates from the reaction medium, without a need for further purification.

Presence of the unpaired electron of the superoxide radical anion may be confirmed by analysis of the precipitate by electron spin resonance spectroscopy (ESR). An ESR spectrograph of titanium superoxide prepared according to a process of the present invention is shown in FIG. 1. The signals at $g_1=2.004$, $g_2=2.010$ and $g_3=2.025$ indicate the presence of the superoxide radical anion. Based on results of analysis by FTIR, ESR, Raman spectroscopy, x-ray diffraction, and on thermogravimetric, differential thermal and elemental analyses, it is believed that the superoxide is formed on a solid hydrated matrix composed of the transition metal precursor, although Applicants do not wish to be held to any particular theory as to the structure of the product.

The product has unusual stability for a superoxide compound, possibly due to the presence of the solid matrix. Samples may be stored for many months at room temperature without loss of superoxide functionality, as indicated by the unchanged signals due to the unpaired electron in ESR spectra of the samples. Unlike alkali metal superoxides such as $KO_2$, transition metal superoxides do not degrade on exposure to air.

Transition metal superoxides are useful as heterogeneous initiators for free radical polymerization, particularly living or controlled free radical polymerizations. Initiation can occur under conditions commonly used in commercial free radical polymerizations, for example, at 80° C. The initiators may be employed in a variety of polymerization environments, including solution, bulk and emulsion. The amount of initiator used is typically about 1%.

Chain transfer agents or molecular weight controlling agents are typically used in conjunction with the transition metal superoxide initiators to regulate molecular weight. An example of a molecular weight controlling agent is 2,2,6,6-tetramethyl-1-pyridinyloxy, free radical, abbreviated as TEMPO. Any of the well known chain transfer agents may be employed, including, for example, mercaptans, such as $C_2$–$C_{20}$ alkyl mercaptans, especially octyl mercaptan and 1-dodecyl mercaptan, and 3-mercapto-propionic acid and esters thereof, such as methyl-3-mercaptopropionate and butyl-3-mercaptopropionate; alcohols such as isopropanol, isobutanol, lauryl alcohol, polyhalogens such as carbon tetrachloride and tetrachlorobromoethane; and combinations thereof. Dithioesters having the structure of formula I, as described above may also be used. Preparation of dithioesters suitable as chain transfer agents in the processes of the present invention is described in International Application WO 99/01478, and in copending U.S. application, Ser. No. 60/210,517. Specific examples of these are compounds of structure II, compounds of structure III, and compounds of structure IV, shown above.

Typically, molecular weight of the polymer produced by the processes of the present invention varies inversely with the amount of chain transfer agent, that is, the lower the amount of chain transfer agent used, the higher will be the molecular weight of the resulting polymer and vice versa. Thus, in order to produce a polymer having molecular weight in the range 1000–100,000, the chain transfer agent is added to the reaction mixture, typically before the initiation of the polymerization process, in an amount ranging from about 0.01 wt % up to about 30 wt %, based on weight of total monomer charge. In particular, from 1 wt % to 10 wt % may be used to achieve a useful molecular weight. The amount of a chain-transfer agent needed to achieve a particular molecular weight, moreover, can be estimated by the use of the equation shown on page 19 of International Application No. WO 99/01478:

$$MW_{prod} = \frac{(moles\, monomer\, consumed)}{(moles\, CTA)} * MW_{mon} + MW_{CTA}$$

EXAMPLES

Example 1

Preparation of Vanadium Superoxide, $V(O_2)_2$

To a stirred solution of vanadium oxyisopropoxide (5 g, 0.02 mol) in dry methanol (30 ml) was added 30% hydrogen peroxide (10 ml, 0.08 mol) dropwise at 25° C. A dark brown precipitate was formed at once with the liberation of heat. The reaction was exothermic, so contents were cooled occasionally. After the addition of 30% $H_2O_2$ was complete, the brown precipitate formed was filtered, washed with water and dried at 25° C. under vacuum for 5 hours. Yield was 2.5 g.

Example 2

Preparation of Titanium Superoxide, $Ti(O_2)_2$

To a stirred solution of titanium tetraisopropoxide (5.0 g) in anhydrous methanol (50 ml), 30% $H_2O_2$ (5.25 g) was added slowly over 30 min under nitrogen. The yellow precipitate that formed immediately was collected by filtration, washed with anhydrous methanol and dried under reduced pressure (1 mm Hg) at 25° C. for 2 h. Yield: 2.40 g.

Example 3

Preparation of Zirconium Superoxide, $Zr(O_2)_2$

To a stirred solution of zirconium (IV) isopropoxide (1.0 g) in dry 2-propanol (25 ml), 30% $H_2O_2$ (12 ml) was added. The mixture was stirred at 25° C. for 12 h. (zirconium (IV) isopropoxide was not completely soluble in 2-isopropanol.) The precipitate superoxide was filtered off and dried under reduced pressure (1 mm Hg) at 25° C. for 2 h. Yield: 550 mg.

Example 4

Preparation of Tungsten Superoxide, $W(O_2)_2$

To a magnetically stirred suspension of tungsten hexacarbonyl $(W(CO)_6)$ (1.2 g) in dry methanol (50 ml), 30% $H_2O_2$ (6.5 ml) was added slowly over 30 min under nitrogen. The precipitated solid was filtered off, washed with anhydrous methanol and dried under reduced pressure (1 mm Hg) at 25° C. for 1 h. Yield: 275 mg.

Examples 5–23

Free Radical Polymerizations

Polymerizations initiated by transition metal superoxides were conducted using raw materials (transition metal superoxides, chain transfer agents, monomers and solvents) as listed in Table 1, using the following general procedure. A 20 ml Schlenk tube under nitrogen atmosphere at 20° C. and 1 bar was charged with 50 mg of transition metal superoxide, 5 g of freshly distilled monomer and 50 mg of a chain transfer agent (if any). The heterogeneous mixture was degassed with nitrogen for 15 minutes. Where the polymerization was conducted at elevated temperature, the mixture was heated to the indicated reaction temperature over a period of about 10 minutes, and held at that temperature for the amount of time indicated in the table.

Monomer conversion to polymer was determined in accordance with the equation:

$$\text{Conversion}(t) = \frac{\text{dry residue}(t) - \text{dry residue}(t=0)}{\text{dry residue}(t=100) - \text{dry residue}(t=0)}$$

where:
  dry residue (t=0) is the dry residue obtained from an aliquot sample of the reaction mixture taken at the time when the reaction mixture had just reached the reaction temperature;
  dry residue (t) is the dry residue obtained from an aliquot sample of the reaction mixture taken at the time t from the reaction mixture; and dry residue (t=100) is the dry residue which would have been obtained if the monomer had been polymerized to 100%.

The dry residue was determined by drying the respective aliquot sample to constant weight at 60° C. and 1 bar.

The number average molecular weight (Mn) and the polydispersity index (Mw/Mn) of the polymers were determined by gel permeation chromatography. For this purpose, the dry residue obtained in each case was taken up in a little tetrahydrofuran, passed at 30° C. using a Waters 515 high-pressure pump through Styragel HR 1, HR 3, HR4E and HR4 columns connected in series, and analyzed by Waters 410 refractometer detectors. GPC data were evaluated by means of a Millennium 32 Software.

% Conversion, number average molecular weight and polydispersity index for the polymers formed were determined and are listed Table 3. The table shows that transition metal superoxide are capable of initiating polymerization of various monomers, with or without chain transfer agents. With suitable chain transfer agents and/or molecular weight controlling agents, polymers produced have a narrow molecular weight distribution, and low polydispersity index.

TABLE 1

Raw Materials and Polymerization Conditions, Examples 5–23

| Ex. No. | Monomer | M | CTA[1] | Temp., ° C./ time, hr | Solvent | Catalyst Recycled? |
|---|---|---|---|---|---|---|
| 5 | St | Ti | 1 | 80°/24 | neat | no |
| 6 | St | Ti | 2 | 80°/24 | neat | no |
| 7 | St | Ti | 3 | 80°/24 | neat | no |
| 8 | St | Ti | 4 | 80°/24 | neat | no |
| 9 | St | Ti | 5 | 80°/24 | neat | no |
| 10 | St | Ti | 6 | 80°/24 | neat | no |
| 11 | St | Ti | 7 | 80°/24 | neat | no |
| 12 | St | Ti | 8 | 80°/24 | neat | no |
| 13 | St | Ti | 9 | 80°/24 | neat | no |
| 14 | St | Ti | 10 | 80°/24 | neat | no |
| 15 | St | W | 1 | 80°/24 | neat | no |
| 16 | MMA | Ti | 1 | 80°/48 | neat | no |
| 17 | St | Ti | 1 | 20°/24 | neat | no |
| 18 | St | Ti | none | 20°/24 | neat | no |
| 19 | St | Ti | none | 80°/24 | neat | no |
| 20 | St | Ti | 1 | 80°/24 | benzene | no |
| 21 | St | Ti | 1 | 80°/3 | neat | yes |
| 22 | St | Ti | TEMPO | 125°/24 | neat | no |
| 23 | St/MAn 50/50, w/w | Ti | 1 | 80°/2 | neat | no |

[1]Structures shown in Table 2.

TABLE 3

Properties of Polymers Synthesized

| Example No. | Monomer | Conv, % | $M_n$ | PDI ($M_w/M_n$) |
|---|---|---|---|---|
| 5 | St | 53 | 4900 | 1.31 |
| 6 | St | 55 | 5600 | 1.31 |
| 7 | St | 25 | 3300 | 1.33 |
| 8 | St | 37 | 4160 | 1.25 |
| 9 | St | 33 | 13531 | 1.26 |
| 10 | St | 56 | 6300 | 1.32 |
| 11 | St | 49 | 6450 | 1.33 |
| 12 | St | 39 | 5800 | 1.31 |
| 13 | St | 48 | 7380 | 1.2 |
| 14 | St | 47 | 6200 | 1.7 |
| 15 | St | 44 | 29800 | 1.6 |
| 16 | MMA | 11 | 500 | 1.7 |
| 17 | St | 0 | — | — |
| 18 | St | 13 | 13500 | 3.35 |
| 19 | St | 77 | 101849 | 1.94 |
| 20 | St | 19 | 3900 | 1.22 |
| 21 | St | 14 | 2698 | 1.21 |
| 22 | St | 22 | 2912 | 1.41 |
| 23 | St/MAn | 34 | 6775 | 1.42 |

TABLE 2

CTA Structures

| CTA No. | Structure | $R_1$ | $R_2$ | $R_3$ | $R_4$ | $R_5$ |
|---|---|---|---|---|---|---|
| 1 | | H | H | H | H | — |
| 2 | | H | H | H | Br | — |
| 3 | | H | H | $CH_3$ | H | — |
| 4 | | H | H | H | COOH | — |
| 5 | | $CF_3$ | H | H | H | — |
| 6 | | | | | | H |
| 7 | | | | | | Br |
| 8 | | | | | | CN |
| 9 | | | | | | COOH |
| 10 | | | | | | |

Examples 24–27

Superoxide-initiated Polymerization in the Absence of CTA polymerizations using 2.0 g monomer (styrene, 4-acetoxystyrene, methyl methacrylate or butyl acrylate) and 0.050 g superoxide, without chain transfer agents, were conducted using the procedure of Examples 5–23, except that 2.0 g monomer and 50 mg superoxide were used. Results are shown in Table 4. A comparison with Table 3 shows that higher molecular weights and higher polydispersity indexes are obtained.

TABLE 4

Superoxide-initiated polymerization in the absence of CTA

| Ex. No. | Monomer | Temp., °C./ time, hr | Conv. % | Mn (GPC) | PDI |
|---|---|---|---|---|---|
| 24 | Styrene | 80/24 | 77 | 101849 | 1.94 |
| 25 | 4-acetoxystyrene | 80/24 | 55 | 10926 | 1.95 |
| 26 | Methyl methacrylate | 60/14 | 90 | 130150 | 2.21 |
| 27 | Butyl acrylate* | 60/14 | 87 | * | * |

* = Not soluble in THF (could be due to high molecular weight)

Examples 28–31

Comparative Examples without Superoxide Initiator

Monomer samples were subjected to conditions as described for examples 5–23, but in the absence of transition metal superoxides and chain transfer agents. Styrene, 4-acetoxystyrene, methyl methacrylate and butyl acrylate (2.0 g for each run) were evaluated. Polymerization time was 14 hours for all runs. Results are shown in Table 5. It can be seen from the table that very low conversions are obtained in the absence of the superoxide, confirming that the superoxide acts as a polymerization initiator.

TABLE 5

Comparative Examples without Superoxide Initiator

| Ex. No. | Monomer | Temp. (° C.) | Conv. % | Mn (GPC) | PDI |
|---|---|---|---|---|---|
| 28 | Styrene | 80 | 11 | 67430 | 1.72 |
| 29 | 4-acetoxystyrene | 80 | 02 | — | — |
| 30 | Methyl methacrylate | 60 | 0.33 | — | — |
| 31 | Butyl acrylate | 60 | 0.35 | — | — |

Examples 32–33

Stability of Superoxide Initiator

In order to confirm stability of titanium superoxide samples, bulk polymerization of styrene and 4-acetoxystyrene were conducted as in Examples 5–23, but using a superoxide sample (50 mg) that had been stored at room temperature under an air atmosphere for about 3 months, with 2.0 g monomer. Polymerization time was 24 hours for both runs. Results are presented in Table 6.

TABLE 6

Stability of Superoxide Initiator

| Ex. No. | Monomer | Temp., ° C. | Conv. % | Mn (GPC) | PDI |
|---|---|---|---|---|---|
| 32 | Styrene | 80 | 77 | 101849 | 1.94 |
| 33 | 4-acetoxystyrene | 80 | 55 | 10926 | 1.95 |

The table shows that titanium superoxide prepared according to the process of the present invention can be stored for at least three months, while maintaining its ability to initiate polymerization.

What is claimed is:

1. A free radical polymerization process comprising:
   combining at least one monomer polymerizable by free radicals and at least one transition metal superoxide of formula $M(O_2)_n$, where M is a transition metal and n is equal to the valence of M;
   generating free radicals from said transition metal superoxide; and
   polymerizing said at least one monomer.

2. A process according to claim 1, wherein M is Ti, W, V, or Zr.

3. A process according to claim 2, wherein M is Ti.

4. A process according to claim 2, wherein M is W.

5. A process according to claim 2, wherein M is V.

6. A process according to claim 2, wherein M is Zr.

7. A process according to claim 1, additionally comprising combining at least one chain transfer agent or molecular weight controlling agent with said at least one monomer and said at least one transition metal superoxide.

8. A process according to claim 7, wherein said chain transfer agent is a dithiocarboxylic ester of formula I:

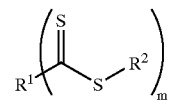

I wherein
   $R^1$ is a m-valent radical selected from the group consisting of alkyl, substituted alkyl, haloalkyl, thioalkyl, heteroalkyl, substituted heteroalkyl, aryl, substituted aryl, haloaryl, thioaryl, substituted thioaryl, heteroaryl, substituted heteroaryl, alkylaryl, haloalkylaryl, thioalkylaryl and substituted thioalkylaryl;
   $R^2$ is selected from the group consisting of alkyl, substituted alkyl, haloalkyl, thioalkyl, heteroalkyl, substituted heteroalkyl, aryl, substituted aryl, haloaryl, thioaryl, substituted thioaryl, heteroaryl, substituted heteroaryl, alkylaryl, haloalkylaryl, thioalkylaryl and substituted thioalkylaryl; and
   m is an integer from 1–6.

9. A process according to claim 8, wherein said chain transfer agent is selected from compounds of structure II, compounds of structure III, compounds of structure IV, and combinations thereof:

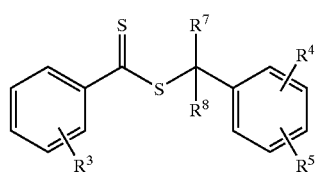

II

-continued

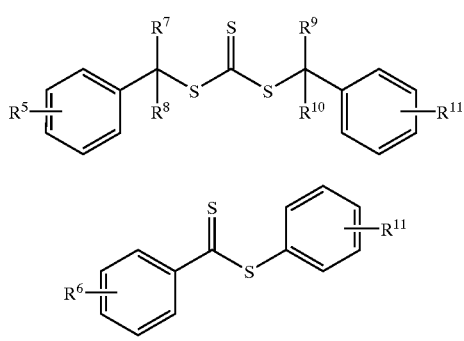

wherein
R³ is hydrogen or haloalkyl;
R⁴ is hydrogen or alkyl;
R⁵ is hydrogen, haloalkyl or carboxy;
R⁶ and R¹¹ are independently hydrogen, alkyl, alkoxy, cyano, halo or carboxy; and
R⁷, R⁸, R⁹ and R¹⁰ are independently hydrogen, alkyl, cyano, aryl, or arylcarboxylate.

10. A process according to claim 8, wherein said chain transfer agent is selected from the group consisting of compounds of Table 7, and combinations thereof:

TABLE 7

| No. | Structure | R₁ | R₂ | R₃ | R₄ | R₅ |
|---|---|---|---|---|---|---|
| 1 |  | H | H | H | H | — |
| 2 |  | H | H | H | Br | — |
| 3 |  | H | H | CH₃ | H | — |
| 4 |  | H | H | H | COOH | — |
| 5 |  | CF₃ | H | H | H | — |
| 6 |  |  |  |  |  | H |
| 7 |  |  |  |  |  | Br |
| 8 |  |  |  |  |  | CN |
| 9 |  |  |  |  |  | COOH |
| 10 |  |  |  |  |  |  |

11. A process according to claim 1, wherein said at least one monomer is selected from the group consisting of styrene, butadiene, acrylate esters, methacrylate esters, and vinyl acetate.

12. A process according to claim 1, wherein temperature ranges from about 0° C. to about 200° C.

13. A process according to claim 12, wherein temperature ranges from about 60° C. to 125° C.

14. A process for the preparation of a transition metal superoxide comprising combining 30% hydrogen peroxide and a transition metal precursor comprising a transition metal compound or complex that is soluble in an aqueous solvent system.

15. A process according to claim 14, wherein said transition metal precursor comprises a soluble transition metal alkoxide, oxyalkoxide, aryloxide, oxyaryloxide, or a complex thereof.

16. A process according to claim 14, wherein said transition metal is titanium.

17. A process according to claim 14, wherein said transition metal is tungsten.

18. A process according to claim 14, wherein said transition metal is vanadium.

19. A process according to claim 14, wherein said transition metal is zirconium.

20. A transition metal superoxide produced by the process of claim 14.

21. A free radical polymerization process comprising:

combining, under an inert atmosphere, and at a temperature ranging from about 60° C. to about 125° C., at least one monomer chosen from styrene, butadiene, methyl methacrylate, butyl acrylate, maleic anhydride, and vinyl acetate, and combinations thereof; a transition metal superoxide selected from titanium superoxide, tungsten superoxide, vanadium superoxide, and zirconium superoxide, and, optionally, a molecular weight controlling agent comprising TEMPO or a chain transfer agent selected from compounds of Table 7:

TABLE 7

| No. | Structure | R₁ | R₂ | R₃ | R₄ | R₅ |
|---|---|---|---|---|---|---|
| 1 | | H | H | H | H | — |
| 2 | | H | H | H | Br | — |
| 3 | | H | H | CH₃ | H | — |
| 4 | | H | H | H | COOH | — |
| 5 | | CF₃ | H | H | H | — |
| 6 | | | | | | H |
| 7 | | | | | | Br |
| 8 | | | | | | CN |
| 9 | | | | | | COOH |
| 10 | | | | | | | whereby said at least one monomer is polymerized.

| No. | Structure | R₁ | R₂ | R₃ | R₄ | R₅ |
|---|---|---|---|---|---|---|
| 1 | | H | H | H | H | — |
| 2 | | H | H | H | Br | — |
| 3 | | H | H | CH₃ | H | — |
| 4 | | H | H | H | COOH | — |
| 5 | | CF₃ | H | H | H | — |
| 6 | | | | | | H |
| 7 | | | | | | Br |
| 8 | | | | | | CN |
| 9 | | | | | | COOH |
| 10 | | | | | | |

50 whereby said at least one monomer is polymerized.

* * * * *

UNITED STATES PATENT AND TRADEMARK OFFICE
CERTIFICATE OF CORRECTION

PATENT NO. : 6,765,076 B2
DATED : July 20, 2004
INVENTOR(S) : Brian C. Benicewicz, Subbareddy Kanagasabapathy and Arumugam Sudalai It is certified that error appears in the above-identified patent and that said Letters Patent is hereby corrected as shown below:

Column 10,
Lines 59-66, replace Structure III as follows:

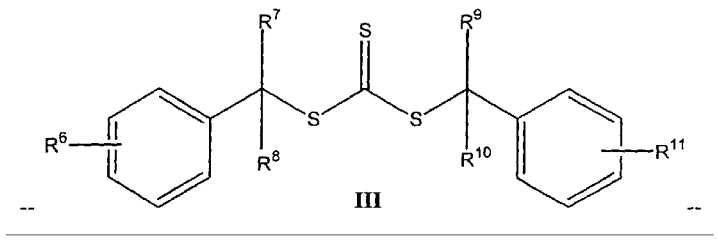

Signed and Sealed this

Seventh Day of September, 2004

JON W. DUDAS
*Director of the United States Patent and Trademark Office*